June 28, 1960  B. H. CLASON  2,943,302
TELEMETRIC SYSTEM FOR GAUGES AND THE LIKE
Filed Nov. 4, 1957  2 Sheets-Sheet 1
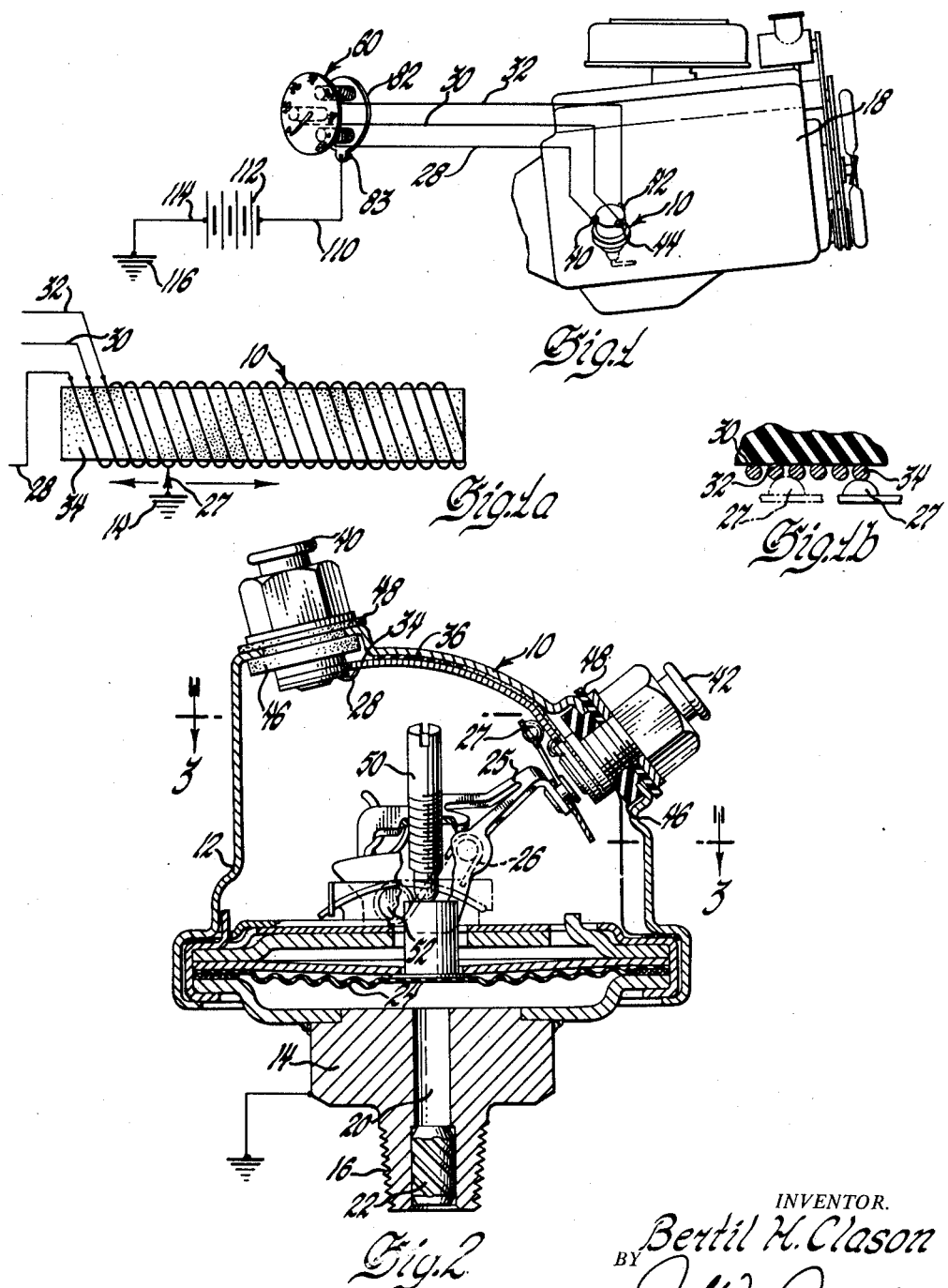
INVENTOR.
Bertil H. Clason
BY
J. W. Lovett
ATTORNEY

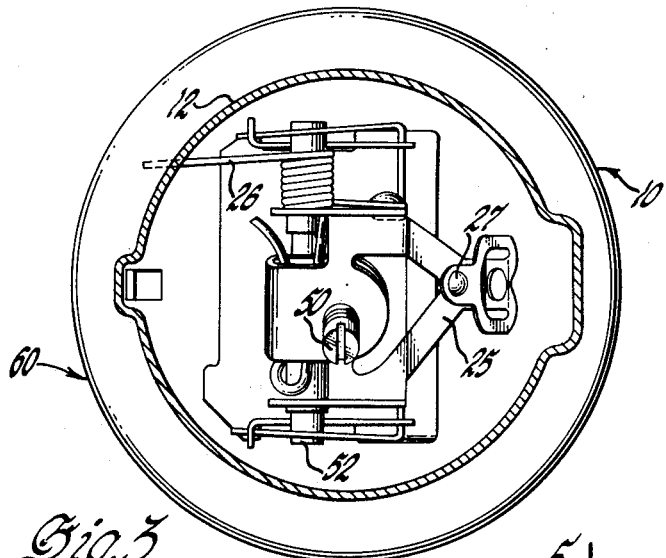
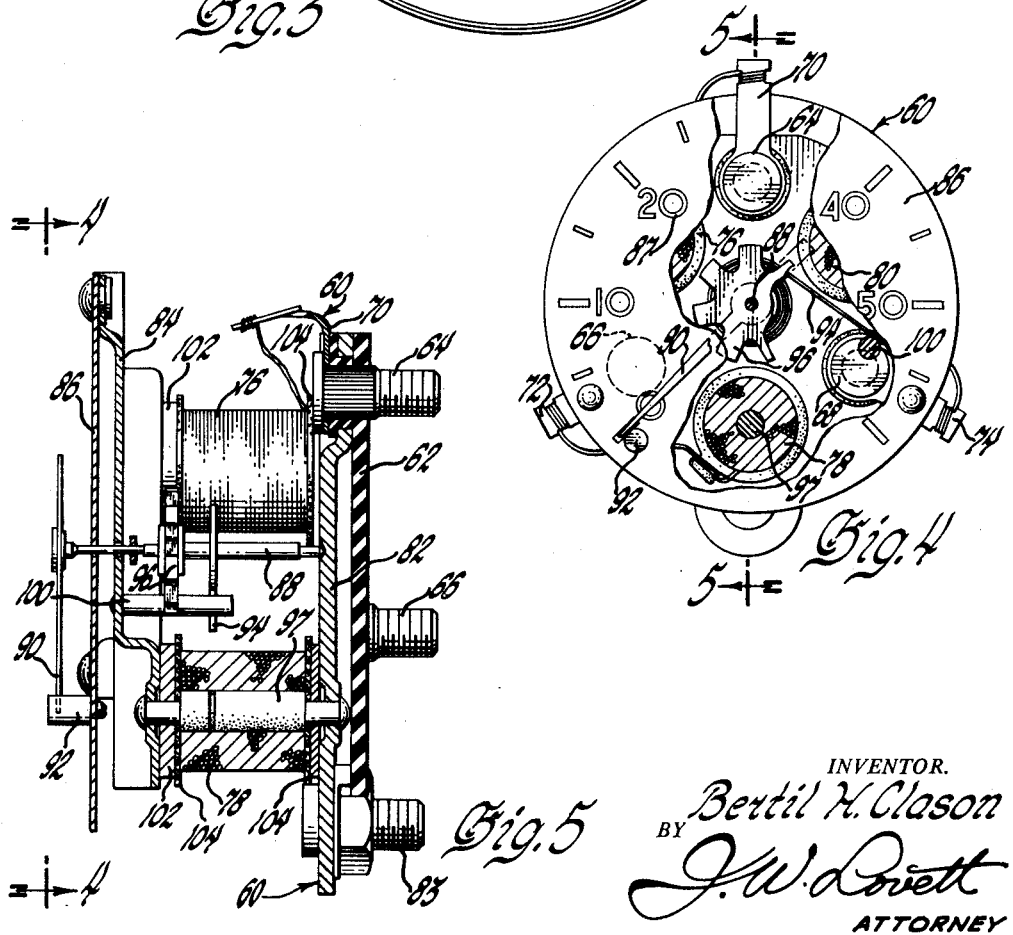

United States Patent Office 2,943,302
Patented June 28, 1960

2,943,302

TELEMETRIC SYSTEM FOR GAUGES AND THE LIKE

Bertil H. Clason, Flint, Mich., assignor to General Motors Corporation, Detroit, Mich., a corporation of Delaware Filed Nov. 4, 1957, Ser. No. 694,297

2 Claims. (Cl. 340—177)

This invention relates to telemetric systems and more particularly to electrically operated systems in which measurements of values such as pressures are translated to indicators.

The present invention is not limited to, but is particularly adapted for, use in the automotive field. It is disclosed with reference to a system for indicating oil pressure in an engine, but it will become obvious as the description proceeds that values other than measurements of pressure may be translated to an indicating unit without departing from the spirit of the present invention.

In the case of an automotive vehicle it is essential that the operator be constantly advised or have the means of becoming advised regarding the pressure of the lubricating oil relied upon for proper operation of his engine. It is obvious that a pressure gauge employed should be as accurate, simple and reliable as possible under the conditions met with and be subject to convenient location possibly remote from the zone in which the measurement of pressure is obtained.

An object of the present invention is to provide an improved telemetric system whereby a measurement of a value such as pressure may be translated to an indicator.

A feature of the present invention is an electrical telemetric system employing parallel circuits operating through a sending unit and indicating unit whereby a signal is imparted by rotation of a multi-prong armature of the latter unit. Another feature is a telemetric system having a signal sending unit with spaced conducting means arranged in parallel and adapted to be contacted sequentially to impart actuating impulses to a receiving unit.

These and other important features of the invention will now be described in detail in the specification and then pointed out more particularly in the appended claims.

In the drawings:

Fig. 1 is a diagrammatic representation of an automotive engine to which a telemetric system is connected as an embodiment of the present invention;

Fig. 1a is a schematic representation of wiring used in a sending unit shown in Fig. 1;

Fig. 1b is an enlarged sectional view of electrical contact details shown in Fig. 2;

Fig. 2 is a sectional view taken through a sending unit shown in the system of Fig. 1;

Fig. 3 is a sectional view looking in the direction of the arrows 3—3 in Fig. 2;

Fig. 4 is a front or elevational view of the indicating unit shown in Figs. 1 and 5 with portions broken away better to illustrate the construction and looking in the direction of the arrows 4—4 in Fig. 5; and Fig. 5 is a section as viewed looking in the direction of the arrows 5—5 in Fig. 4.

A sending unit 10 for securing a signal as to the value of lubricating oil pressure is depicted in Figs. 1, 2 and 3 of the drawings. It is also diagrammatically presented in Fig. 1a. A unit, similar in some respects to the present unit 10, is disclosed in the United States Patent 2,286,717 granted June 16, 1942, in the name of Ragnar Clason. It comprises a casing 12 with a base 14 threaded at 16 for attachment to a support such as the crankcase of the engine 18. The base 14 is apertured at 20 for communication with the pressurized oil system of the engine. A spiral restriction plug 22 is arranged within an enlarged portion of the aperture 20 to prevent the effect of undue pressure fluctuation on a diaphragm 24 in the unit. The diaphragm is adapted, through a swinging arm 25 and a biasing spring 26, to move a spring loaded contact button 27 across and constantly in contact with one or two of three spaced wires 28, 30 and 32 wound about an arcuate plate 34 of non-conducting material. The wires are spaced from each other and are also insulated from the casing by an insulator sheet 36. Three terminal posts 40, 42 and 44 are mounted on the casing 12 and each is insulated from the latter by two washers 46 and 48. The plate 34 is fixed in position by two of the posts 40 and 42. Each of the three posts is connected to one of the wires 28, 30 or 32. Calibration of the unit 10 is by means of a screw 50.

As in the Patent 2,286,717, heretofore referred to, the calibration of the sending unit 10 is accomplished by rocking the calibrating screw 50 bending the lever 25. This has the effect of changing the effective leverage of the lever assembly to cut it down or increase it depending on whether the diaphragm and the spring combination are too soft or too stiff. For zero adjustment of the pointer 90, the screw 50 is adjusted by rotation.

Further details regarding the unit 10 are not given here as details such as the calibration screw, casing and diaphragm are amply illustrated in the patent referred to insofar as the present invention is concerned. It will be noted, however, that the arm 25 and button 27 are adapted to rotate in one direction around a shaft 52 (clockwise in Fig. 2) by action of the oil pressure on the diaphragm 24 and in the other direction by virtue of the spring 26 when the oil pressure reduces. The contact button 27, lever 25, return spring 26 are grounded to the engine 18 through the base 14.

The indicator 60 is shown in Figs. 1, 4 and 5 and is of the pointer type and suitable for mounting on the instrument panel of the vehicle. It comprises an insulating plate 62 into which is pressed three spaced terminal studs 64, 66 and 68. Each of these is connected by means of a terminal strip 70, 72 or 74 to one of equally spaced electromagnetic coils 76, 78 and 80. The power connection for these coils is provided through a mounting plate 82 and supporting bolt 83. A dial mounting plate 84 supports a dial 86 bearing symbols 87 and, together with the plate 82, acts as bearing means for a spindle 88. Attached to one end of this spindle is a pointer 90 arranged to cooperate with the dial 86. A pointer stop 92 is fixed to the dial 86 at the zero reading. Also fixed to the spindle 88 is one end of a return hairspring 94 and a seven prong armature 96 made of an iron plate. The outer coil of the hairspring 94 is extended and fastened to a post 100 staked to the dial mounting plate 84. Each of the coils 76, 78 and 80 has an iron washer such as the washer 102 at one end and adjacent the dial mounting plate 84. Each of the coils 76, 78 and 80 is provided at each end with an insulating washer 104 and also with an iron core 97 peened over at its ends to hold the assembly together.

As clearly seen in Fig. 5, the iron armature 96 is so placed that its radial prongs lie in the same plane as do the iron washers 102 of the three coils. In the particular embodiment illustrated, the armature is provided with seven prongs for proper cooperation with the three washers 102.

Fig. 1 shows the plate 82 of the indicator unit connected by a line 110 to a battery 112 which in turn is connected by a line 114 to ground at 116.

In operation of the telemetric system, a generation of lubricating oil pressure within the engine 18 will cause the diaphragm 24 to so act as to cause the contact button 27 to slide along the arcuate plate 34 toward its position shown in Fig. 2. The button 27 will assume a position corresponding to the lubricating oil pressure. As the button moves, its sequential contact with the wires 28, 30 and 32 effects electrical impulses actuating the receiving unit coils 76, 78 and 80 in that order and repeating that order of actuation until the proper position of the button 27 is reached. As a result, the particular prong of the armature 96 nearest to the coil actuated at a particular time will be most strongly attracted by the iron washer 102 associated with that coil. As the coils are actuated in turn, the pointer 90 will be caused to turn in a clockwise direction, shown in Fig. 4, upon increase of oil pressure. Movement of the pointer will be reversed when the oil pressure decreases and, with no oil pressure existing, the return spring 94 will cause the pointer 90 to return to its point of rest or zero position against the stop 92.

It should be noted that with the wires 28, 30 and 32 spaced on the plate 34, the contact button 27 will alternately contact one and then two wires as it slides along the plate as illustrated in Fig. 1b. This sequential contact will actuate first one and then two coils in the indicator resulting in the armature prongs alternately to stop opposite a coil and then between two coils. Should the current be interrupted, as when switching off the ignition in a car and thereby disrupting current from the battery 112, the pointer is returned to its zero position. With the instant embodiment, the pointer 90 is adapted to move in 31 steps for a total movement of 270 degrees.

I claim:

1. A telemetric system comprising a source of electrical power, a sending unit including a grounded contact movable a distance through an arcuate path proportional to a value to be measured and three spaced conductors wound in parallel having multiple lengths thereof extending in sequence transverse to said path, an indicating unit remote from said sending unit and including at least three electromagnetic coils and a magnetic armature in the form of a plate having annularly and radially extending prongs, a flat magnetic element arranged at the end of each of said coils and in a plane common with the armature prongs, a rotatable shaft carrying a pointer and said armature, circuits connecting said coils in parallel to said source of power, each of said circuits including one of said conductors and one of said coils, and said contact being arranged to close said circuits sequentially upon movement along said path thereby to energize said coils sequentially and impart a step-by-step rotation to said shaft and pointer.

2. A telemetric system such as set forth in claim 1 and suitable for use in the automotive field, the indicating unit armature prongs being odd in number and greater than three.

References Cited in the file of this patent

UNITED STATES PATENTS

| | | |
|---|---|---|
| 1,610,546 | Brandecker | Dec. 14, 1926 |
| 2,197,636 | Faus | Apr. 16, 1940 |
| 2,206,512 | Reinholz et al. | July 2, 1940 |
| 2,286,717 | Clason | June 16, 1942 |